(12) United States Patent
Straeter

(10) Patent No.: US 10,159,185 B2
(45) Date of Patent: Dec. 25, 2018

(54) CHOPPER ASSEMBLY FOR A HARVESTING IMPLEMENT

(76) Inventor: James E. Straeter, Rochester, IN (US)

(*) Notice: Subject to any disclaimer, the term of this patent is extended or adjusted under 35 U.S.C. 154(b) by 772 days.

(21) Appl. No.: 13/591,293

(22) Filed: Aug. 22, 2012

(65) Prior Publication Data

US 2014/0053523 A1 Feb. 27, 2014

(51) Int. Cl.
*A01D 45/02* (2006.01)
*A01D 41/14* (2006.01)
*A01D 43/08* (2006.01)

(52) U.S. Cl.
CPC ......... *A01D 45/021* (2013.01); *A01D 41/144* (2013.01); *A01D 43/08* (2013.01); *A01D 43/081* (2013.01)

(58) Field of Classification Search
CPC ............................ A01D 43/081; A01D 41/144
USPC ................. 56/228, 15.9, 16.2, 60, 500, 503
See application file for complete search history.

(56) References Cited

U.S. PATENT DOCUMENTS

| | | | | |
|---|---|---|---|---|
| 1,979,470 | A * | 11/1934 | Johnston | F16L 13/11 156/182 |
| 2,725,702 | A | 12/1955 | Ross | |
| 4,409,780 | A * | 10/1983 | Beougher et al. | 56/228 |
| 4,875,330 | A * | 10/1989 | Deutsch | A01D 46/08 56/28 |
| 5,142,851 | A | 9/1992 | Lydy et al. | |
| 5,673,543 | A * | 10/1997 | Richardson et al. | 56/85 |
| 5,911,625 | A * | 6/1999 | von Allworden | 460/119 |
| 6,430,907 | B2 | 8/2002 | Wolters et al. | |
| 6,775,969 | B2 * | 8/2004 | Wuebbels et al. | 56/208 |
| 7,043,889 | B2 * | 5/2006 | Rauch | 56/15.9 |
| 7,051,505 | B2 * | 5/2006 | Brannstrom | 56/327.1 |
| 7,162,855 | B2 * | 1/2007 | Boeckmann et al. | 56/15.2 |
| 7,301,929 | B2 * | 11/2007 | Frederiksen et al. | 370/342 |
| 7,360,351 | B2 * | 4/2008 | Rickert et al. | 56/228 |
| 7,553,225 | B2 | 6/2009 | Benes | |
| 7,640,741 | B2 * | 1/2010 | Hara | 60/527 |
| 7,856,800 | B2 | 12/2010 | Straeter | |
| 8,087,223 | B2 | 1/2012 | Straeter | |
| 8,091,331 | B2 * | 1/2012 | Dow et al. | 56/192 |
| 8,141,332 | B2 | 3/2012 | Straeter | |
| 8,196,379 | B2 | 6/2012 | Straeter | |
| 2003/0226342 | A1 * | 12/2003 | Boeckmann et al. | 56/14.7 |

(Continued)

FOREIGN PATENT DOCUMENTS

DE 19815571 A1 10/1999
FR 2480556 A1 10/1981

OTHER PUBLICATIONS

Application in Poland; 6 pages from an untitled slide show which shows a Geringhoff 8 folding cornhead, published on or before Aug. 22, 2012, Poland, Central Europe.

(Continued)

*Primary Examiner* — Thomas B Will
*Assistant Examiner* — Mai T Nguyen
(74) *Attorney, Agent, or Firm* — Zarley Law Firm, P.L.C.

(57) ABSTRACT

A chopping assembly for a harvesting implement having a blade assembly, a housing, and a guide. The blade assembly is disposed within the housing and the guide directs cornstalks toward an input port on the housing. The blade assembly not only cuts the cornstalk from its root but also chops the stalk into stover. A fluid dynamic force is created by the blade assembly to direct the stover with the aid of the housing to an output port.

10 Claims, 16 Drawing Sheets

(56) References Cited

U.S. PATENT DOCUMENTS

2010/0257831 A1 10/2010 Straeter
2010/0313539 A1 12/2010 Straeter
2011/0113743 A1 5/2011 Straeter
2011/0146217 A1 6/2011 Carboni
2012/0023883 A1 2/2012 Straeter

OTHER PUBLICATIONS

European Patent Office, "Supplementary European Search Report", EP Appl. No. 13 83 0363, dated Mar. 15, 2016, 5 pages.

* cited by examiner

CHOPPER ASSEMBLY FOR A HARVESTING IMPLEMENT

FIELD OF THE INVENTION

This invention relates to a chopper assembly. More particularly, this invention relates to a chopper assembly for a harvesting implement.

BACKGROUND OF THE INVENTION

Harvesting corn is well known in the art. Conventionally, corn pickers remove the ears from the stalks and process those ears on through the machine, while leaving the stalks flattened against the ground and secured to their root structure. The stalks left in this condition are difficult to pick up and utilize for corn fodder, silage or biomass. To improve upon this, devices have been developed that not only remove the ears of corn from the stalks, but also cut the stalks and put them into a windrow whereupon they can be easily picked up and utilized as desired, such as by being processed through a chopping machine.

While these devices have provided some improvement in the art, there are still deficiencies preventing commercial adoption. To begin, these devices require many moving parts, are complex to manufacture, and are susceptible to wear. In addition, the devices are built into the machine and therefore are difficult to remove and repair. Finally, because these devices are built into the machines they are not adaptable for use on different corn heads for desired applications. Accordingly, there exists a need in the art for a device that addresses these deficiencies.

Therefore, an object of the present invention is to provide a chopping assembly for a harvesting implement that has fewer moving parts.

Another objective is to provide a dedicated chopper/transport assembly for each individual row without impacting adjacent rows.

Yet another object of the present invention is to provide a chopping device for a harvesting implement that is removable.

A still further object of the present invention is to provide a chopping assembly for a harvesting implement that is adaptable to different sized corn headers.

These and other objects, features, or advantages of the present invention will become apparent from the specification and claims.

SUMMARY OF THE INVENTION

A chopping assembly for a harvesting implement having a blade assembly, a housing, and a guide. The blade assembly is disposed within the housing and the guide directs cornstalks toward an input port on the housing. The blade assembly not only cuts the cornstalk from its root but also chops the stalk into stover. A fluid dynamic force is created by the blade assembly to direct the stover with the aid of the housing to an output port.

DETAILED DESCRIPTION OF THE PREFERRED EMBODIMENT

Figure 1:
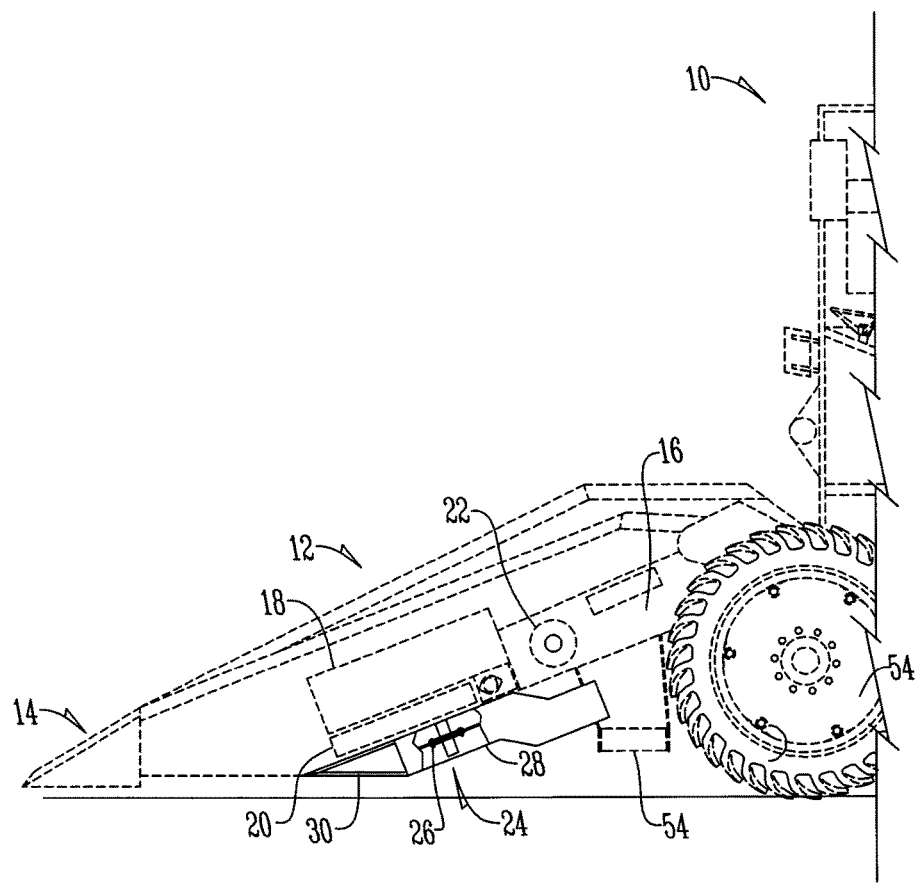
FIG. 1 is a side elevational view of a combine having a corn head with an attached chopper assembly.
Figure 2:
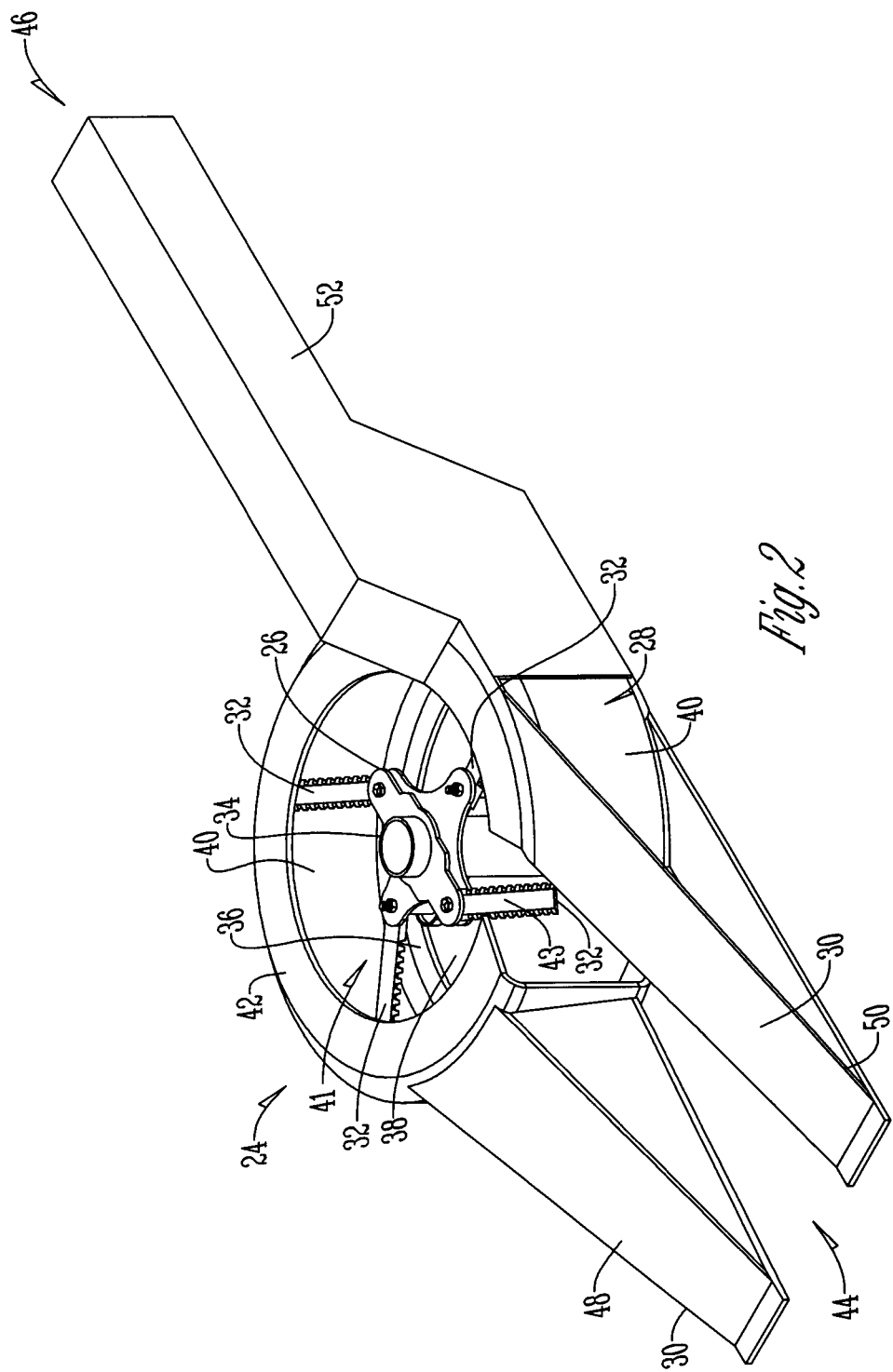
FIG. 2 is a bottom perspective view of a chopper assembly.
Figure 3:
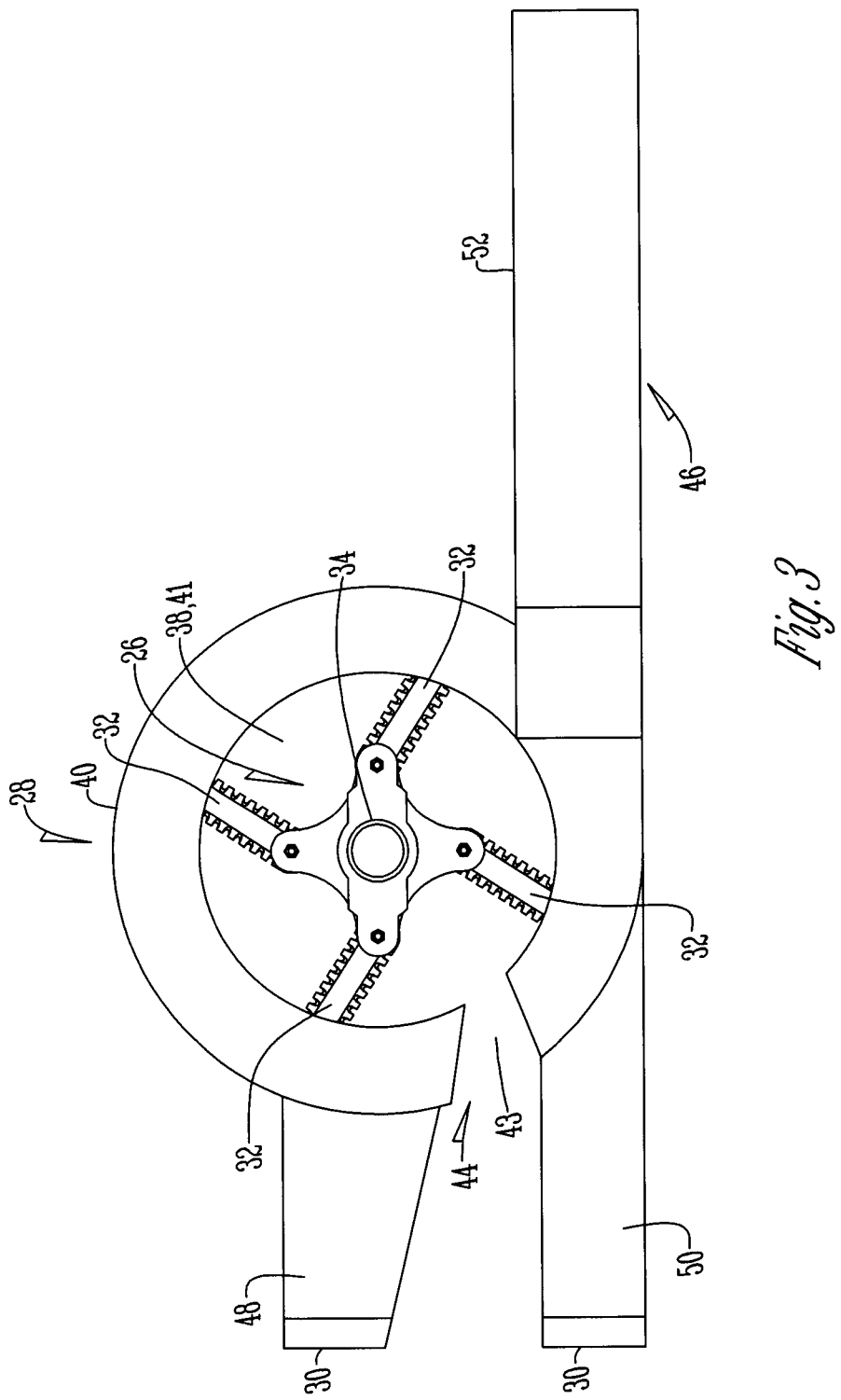
FIG. 3 is a bottom elevational view of a chopper assembly.
Figure 4:
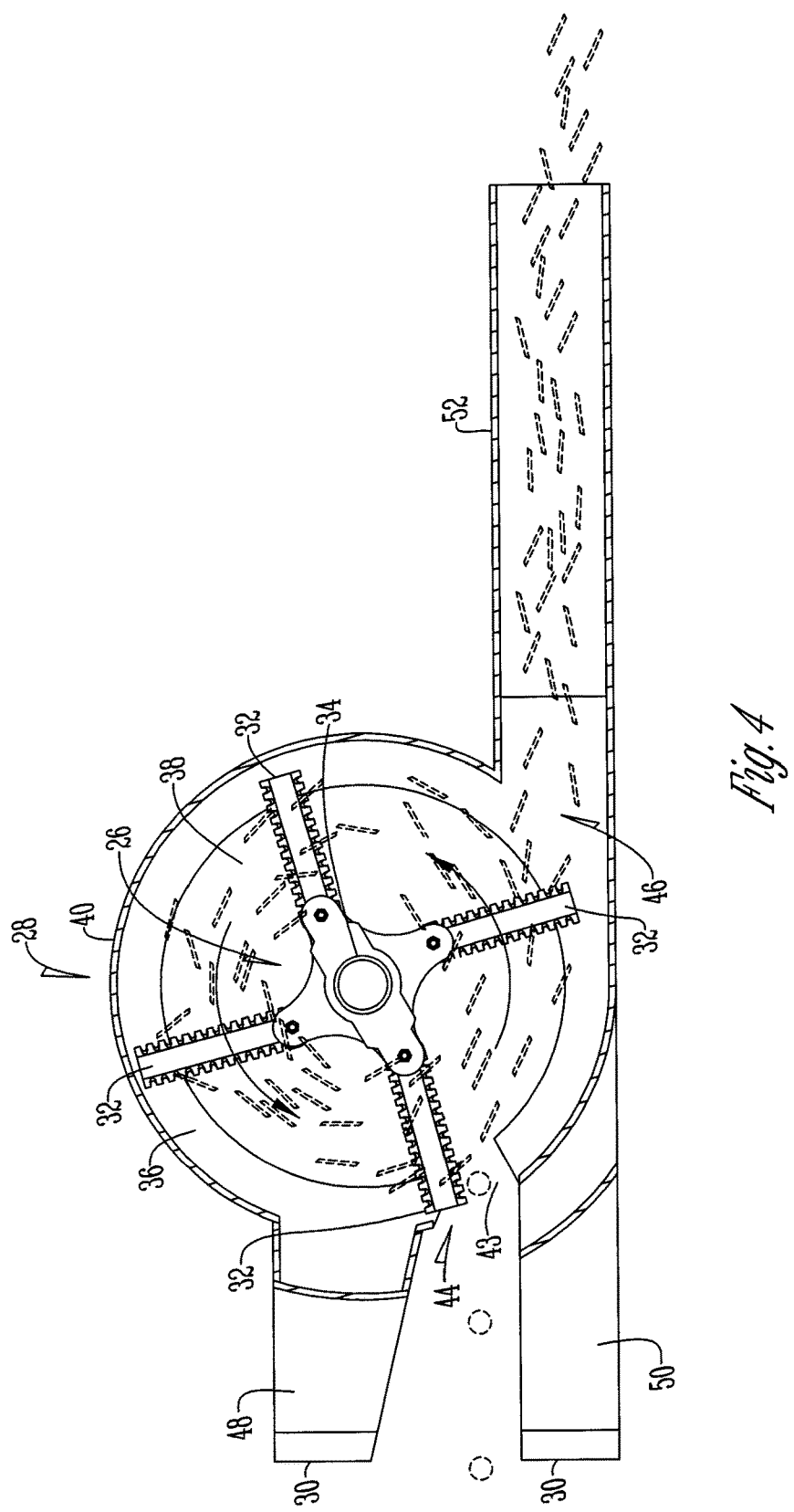
FIG. 4 is a bottom sectional view of a chopper assembly.
Figure 5:
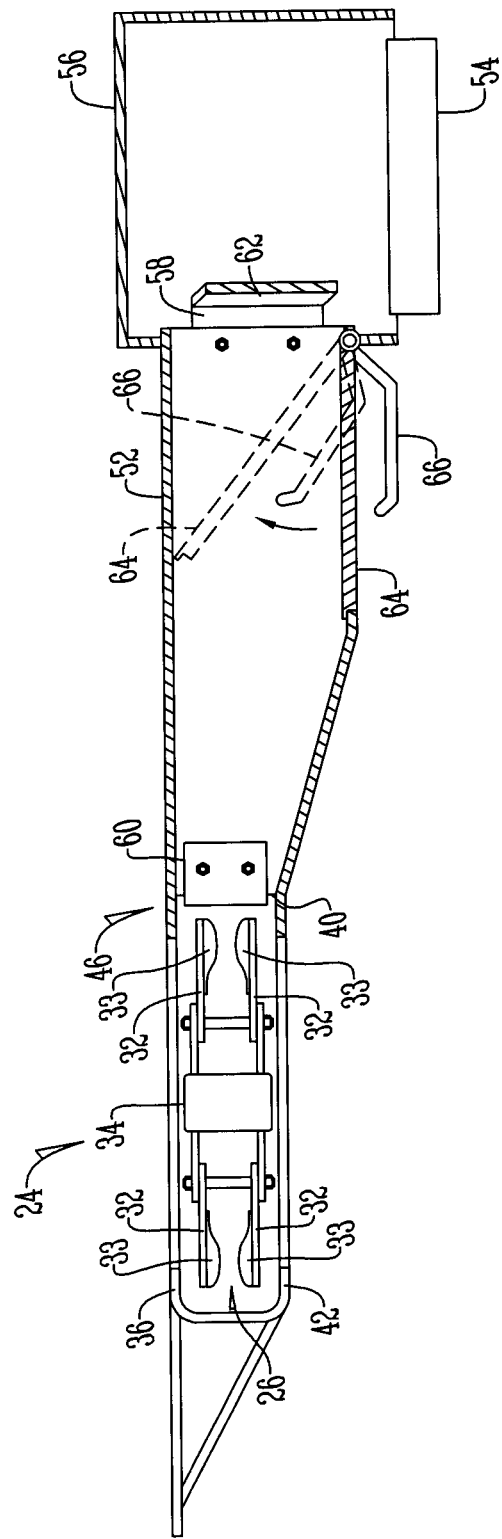
FIG. 5 is a side view in partial cross section of a chopper assembly.

With reference to the figures, a harvesting implement 10, such as a combine, has a corn head 12 carried by the combine. The corn head 12 has a plurality of gathering shoes 14 and a frame 16. Positioned between each pair of adjacent gathering shoes 14 is a picking assembly 18 which has stalk rolls 20 that interact with the cornstalks and ears of corn, and an auger 22 positioned behind the picking assembly 18 to direct the picked corn to a desired location. While preferably the implement picks corn, other crops are contemplated including sunflowers, milo and the like.

The chopping assembly 24 is positioned below and mounted to the corn head 12. The chopping assembly 24 includes a blade assembly 26, a housing 28, and a chopper guide 30. The blade assembly 26 includes a plurality of blades 32 that are attached to and extended outwardly from a drive shaft 34. In one embodiment, the blades 32 lie in more than one generally perpendicular plane in relation to the drive shaft 34. Preferably, each blade 32 has a wing 33 and a sharp cutting edge on both sides making the blades reversible. The drive shaft 34 is connected to a source of power (not shown).

Surrounding the blade assembly 26 is a housing 28. The housing 28 has a top wall 36 connected to the corn head frame 16 with an opening 38 through which the drive shaft 34 extends, an arcuate side wall 40 and a bottom wall 42 having an opening 41 and a slot 43. The side wall 40 has an input port 44 and an output port 46.

The chopper guide 30 includes two elongated members 48, 50. The elongated members 48, 50 are mounted in spaced angled relation to the bottom of the corn head 12 at one end and the bottom of the housing 28 at the opposite end. The angle of the elongated members 48, 50 tapers downwardly and inwardly from the corn head 12 to the housing 28.

Mounted to and in communication with the output port 46 is an outwardly extending exhaust channel or conduit 52. The exhaust channel 52 is adjacent to a conveyor 54 at the end remote from the exhaust port 46.

The conveyor 54 has a removable cover 56 that allows for easy access to the conveyor 54 to unplug or service the conveyor 54. Within the conveyor 54, on the side walls of the cover 56 are guides 58 that direct material on the conveyor 54.

Located at the entrance of the exhaust channel 52 is an adjustable shear plate 60 that is connected to the exhaust channel 52. The adjustable shear plate 60 allows one to adjust the clearance between housing 28 and the exhaust channel 52 to protect and prevent wear of the channel 52. At the opposite end of the channel 52 is a deflector 62 that guides the material toward the center of the combine as material leaves the channel 52. In one embodiment, the walls of the channel 52 are tapered such that the cross section is increasing as material moves toward the discharge end.

In an additional embodiment the channel 52 has a door 64 that is part of the bottom wall of the channel 52. In a normal position, the door 64 lies parallel to the bottom wall. The door is opened by a handle 66 which permits material to fall to the ground when desired.

Figure 6:
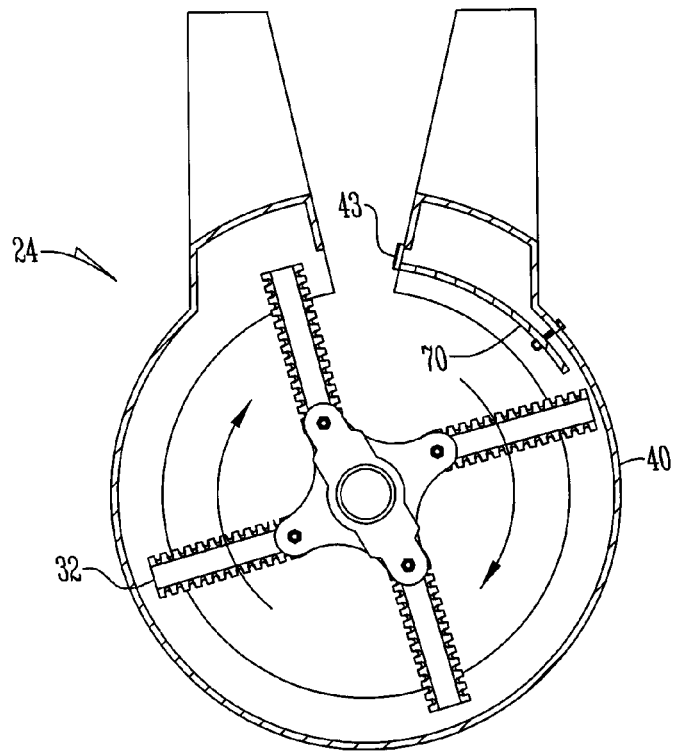
FIG. 6 is a cutaway top plan view of a chopping assembly.

As best shown in FIG. 6 the sidewall 40 of chopping assembly 24 can include an adjustable strike plate 70 adjacent the slot 43. The strike plate is removeable and replaceable depending on the desired particular application. For example when the stover is to be used for feed and then needs to be roughed up to provide greater surface area so the stover absorbs a maximum amount of moisture and additives the strike plate used has a roughened surface. Alternatively, when less damaged stover like that used in bedding application is desired, a smooth strike plate 70 is utilized.

The strike plate 70 is positioned to take energy from stalk material entering the chopping assembly 24. By making the strike plate 70 adjustable the clearance between the sidewall 40 and blades 32 can be controlled to ensure stover is not pinned between the wall and blades 32. In addition any damage caused by a rock or broken blade 32 to the strike plate is easily handled because the strike plate can be replaced without replacing the entire housing.

Figure 7:
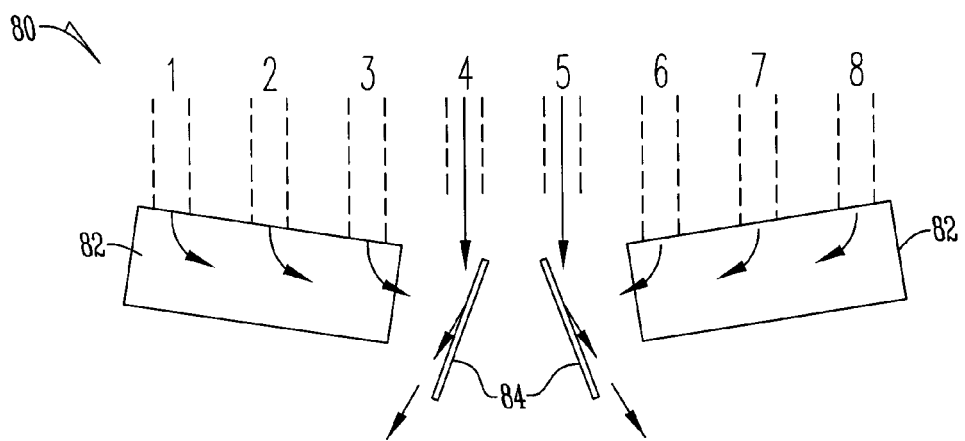
FIG. 7 is an elevated top plan view of a conveyor system for a farm implement.

FIG. 7 shows an improved conveyor system 80 utilized with the chopping assembly 24. The conveyor system 80 utilizes angled conveyors 82 to release the stover material coming out of the exhaust channel 52. Additionally the angled non-perpendicular conveyors widen the windrow as a result of the material not being deposited in a tight line coming off the conveyor. The conveyor system 80 also utilizes a plurality of shields 84 adjacent the end of the angled conveyors 82 to block material coming off of conveyors 82 from landing in the center of the windrow, making a wider windrow and optionally two separate windrows. This assists in the drying of the windrow. Thus the conveyor system 80 provides an internal system that can be used to control the windrow without the need of varying the conveyor speed.

Figure 8:
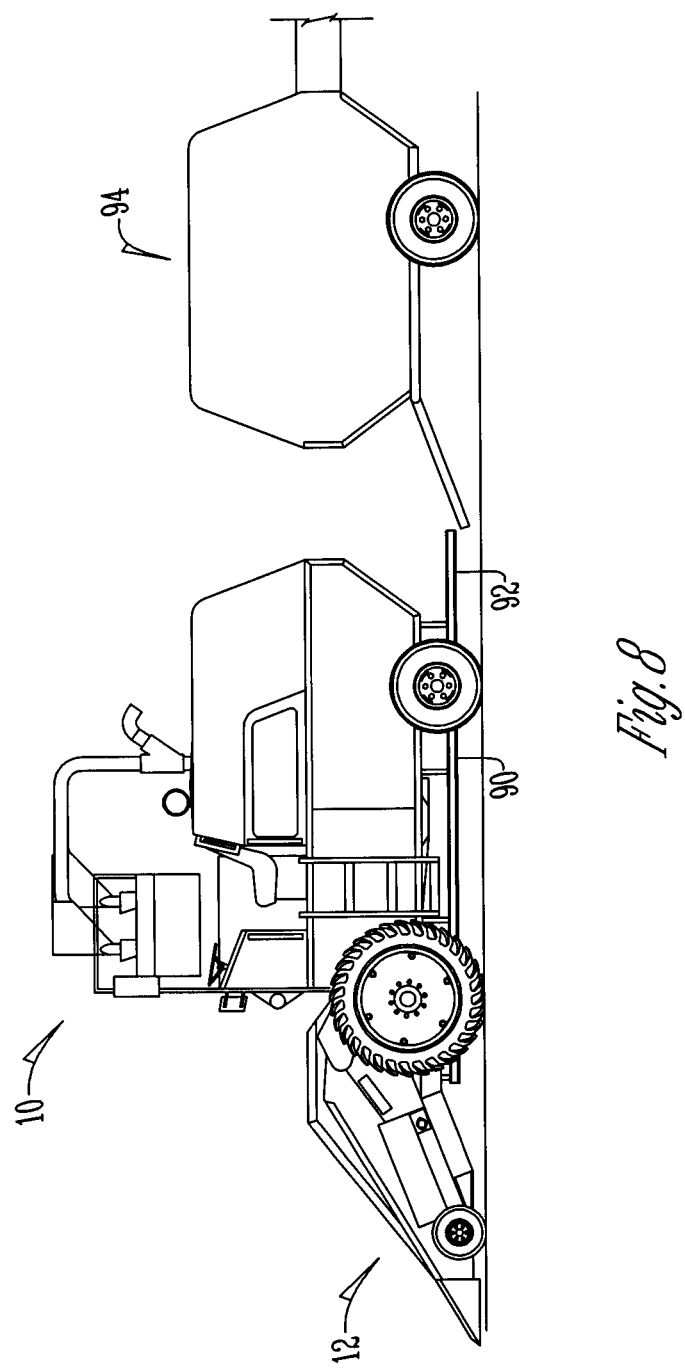
FIG. 8 is a side plan view of a direct bale conveyor for a farm implement.

FIG. 8 shows an alternative embodiment of the harvesting implement 10 that utilizes a direct bale conveyor 90. In this embodiment the harvesting implement has a conveyor 92 that runs under the implement 10 and is positioned to receive the windrow. By having the windrow land on the conveyor 92 that runs under the implement 10 the stover can be moved from the corn head 12 as well as material coming out of the combine to a point at the rear of the implement 10. A secondary processing unit 94 that preferably is a trailing baler can then accept the material on another baler mounted conveyor to be baled without contacting the ground and being contaminated with soil. Thus stover from the head and combine can be provided to the secondary or processing unit 94.

Figure 9:
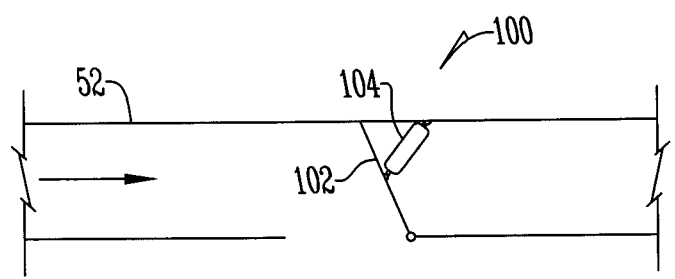
FIG. 9 is a side plan view of a door assembly for a farm implement.

FIG. 9 shows a door controller system 100 that controls a door 64 or 102 associated with exhaust channel 52. The door control system utilizes controllers 103 that have an operating system that can operate manually or utilize a GPS based system that can be utilized by a user in order to control an electric actuator 104 to close and open the door 102. In this manner the operator is able to dump more stover in some areas of the field than others for erosion control purposes as well as insure that the right amount of stover is taken off the field where the crop is heavier or less dense.

Figure 10:
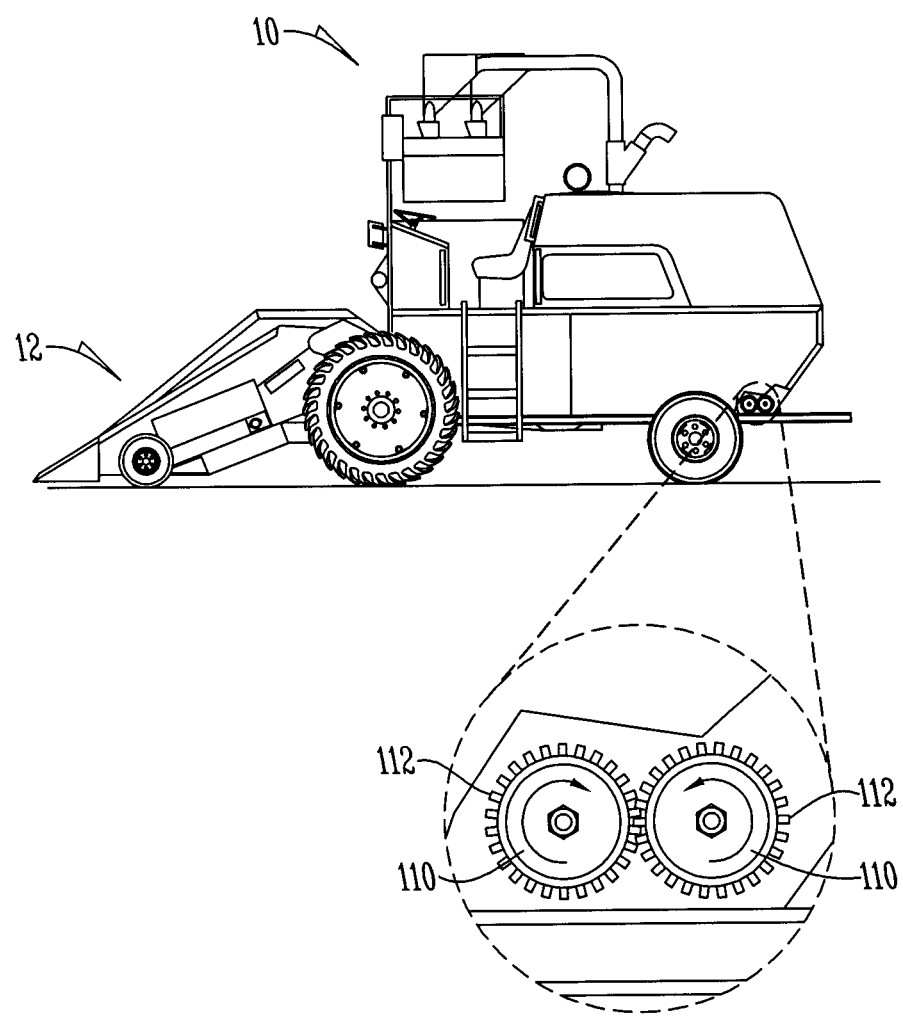
FIG. 10 is a side plan view of a processor roll assembly for a farm implement.

FIG. 10 shows yet another embodiment wherein processor rolls 110 are utilized that contain a plurality of teeth 112 and are positioned at the back of the combine adjacent to where corn cobs are discharged. Specifically the corn cobs discharge into the rolls 110 to be broken into multiple pieces to minimize the amount of whole cobs left in stover that may later need to be removed when the stover is utilized for certain beneficial uses such as cattle feed.

Figure 11:
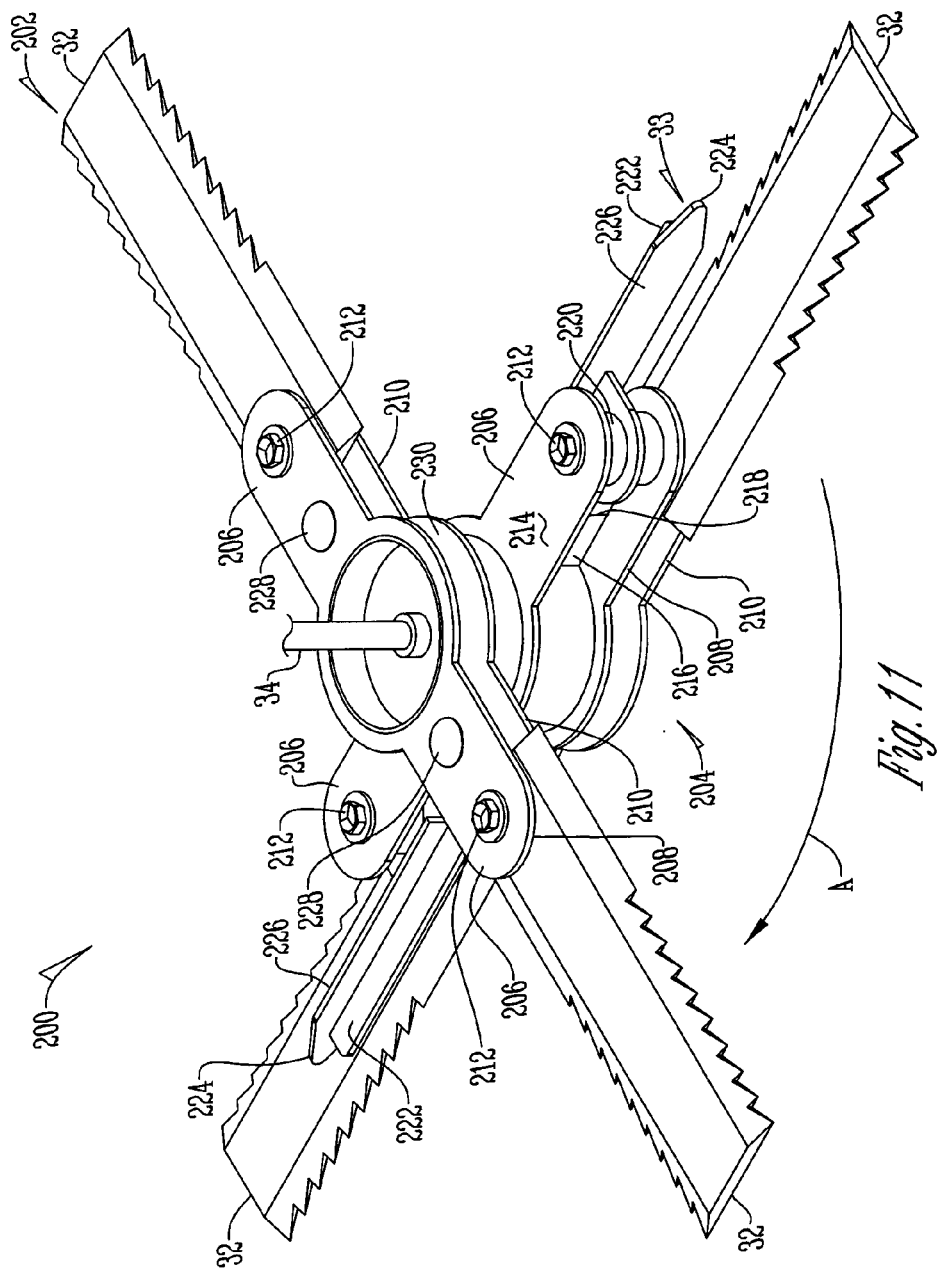
FIG. 11 is a perspective view of an adjustable blade assembly.

Adjustable Blade Assembly: FIG. 11 shows an adjustable blade assembly 200 that connects to drive shaft 34. Adjustable blade assembly 200 includes a plurality of blades 32. Adjustable blade assembly 200 has a top rotor portion 202 which is positioned on top of a bottom rotor portion 204.

Top rotor portion 202 and bottom rotor portion 204 are removably, replacably and rotatably connected to one another. Top rotor portion 202 and bottom rotor portion 204 have opposing arms 206 which extend outwardly from one another in a flat plane. Each opposing arm 206 has a top member 208 and a bottom member 210 positioned in parallel spaced alignment with a space positioned therebetween. Extending perpendicularly across the space between top member 208 and bottom member 210 through a throughhole is axel 212. Preferably, axel 212 is positioned at, near or adjacent to the outward end of each arm 206. Preferably, axel 212 is removable and replaceable, and in one embodiment takes the form of a hardened nut and bolt. Axel 212 passes through a through-hole positioned at, near or adjacent the inward end of blade 32 thereby connecting blade 32 to arm 206 while allowing blade 32 to freely rotate upon axel 212. While top and bottom rotor portions 202, 204 are shown having two arms 206 extending outwardly from one another at 180° s, three arms 206 extending at 120° s from one another, four arms 206 extending at 90° s from one another, etc. is hereby contemplated.

Bottom rotor portion 204 has a third member 214 positioned above top member 208 which is positioned in parallel spaced alignment with a space therebetween. The space between top member 208 and third member 214 is greater than the space between top member 208 and bottom member 210. Axel 212 in bottom rotor portion 204 also extends across the space between top member 208 and third member 214. Positioned and extending outwardly from shaft 34 towards axel 212 is extension 216. Extension 216 connects at its top edge to the bottom side of third member 214, and at its bottom edge to the top side of bottom member 210. Extension 216 terminates at its outward edge 218 prior to axel 112, thereby leaving a space between outward edge 118 and axel 212. The face of extension 216 is generally in perpendicular alignment to the direction of rotation of adjustable blade assembly 200.

Wing 33 is positioned on the portion of axel 212 extending between top member 208 and third member 214. Wing 33 has a collar 220 having a centrally positioned throughhole through which shaft 212 extends. Collar 220 is preferably a round tube which extends from the bottom side of third member 114 to the top side of bottom member 210 which freely rotates upon shaft 212. Extending outwardly from collar 220 is vane 222. Vane 222 extends a length before terminating at tip 224. Preferably, vane 222 curves or angles down at tip 224 therefore presenting less surface area at tip 224 as compared to where it attaches to collar 220. Vane 222 is preferably not as long as blade 32, and therefore tip 224 is positioned inward of the outward most edge of blade 32. Preferably, vane 222 has a flat face 226 which is parallel to the length of shaft 34 and direction of travel. Alternatively, the leading edge of vane 222 is positioned in front of the trailing edge of vane 222 so as to provide an angle that will motivate air and material upward or towards corn head 12 when vane 222 is rotated.

Preferably, vane 222 is offset from the axis of axel 212. That is, preferably vane 222 does not extend in alignment with the center of top, bottom and third members 208, 210, 214, or with the center of the axis of axel 212. Instead, vane 222 is connected to collar 220 rearward of the axis of axel 212, which is rearward of the direction of travel or rotation. In the event that collar 220 is round when viewed from above, in one arrangement, vane 222 extends from the tangent, or rearward most edge of collar 220 perpendicular to the axis of axel 212. This positioning places the length of vane 222 more towards the rear edge of the blade 34 connected to axel 212 rather than the forward or leading edge. In one arrangement, vane 222 is positioned above and in parallel alignment with the rear edge of blade 32. This rearward positioning of vane 222 helps to motivate air and material towards conveyor 54. In addition, positioning vane 222 rear of the leading edge of blade 32 ensures that the material meets the leading edge of blade 32 before interacting with vane 222. This extends the useful life of wing 33 and ensures that knife 32 cuts material before wing 33 expends energy into the material to motivate it through the system.

Because the blades 32 and wings 33 are allowed to freely rotate on axels 212, when the adjustable blade assembly 200 is rotated centrifugal force causes blades 32 and wings 33 to extend outwardly from the axis of rotation. However, when the adjustable blade assembly 200 abruptly stops rotating, due to momentum, blades 32 and wings 33 swing forward on axels 212. By positioning vane 222 rear of the axis of axel 212, this helps to reduce or prevent wing 33 from violently swinging on axel 212 and colliding with extension 216 or other portions of the assembly when rotation of the adjustable blade assembly 200 is stopped. This prevents breakage and extends the useful life of wing 33 and other components of adjustable blade assembly 200.

Top rotor portion 202 and bottom rotor portion 204 are rotatably connected to one another. That is, the angle of the top rotor portion 202 and the bottom rotor portion 204 can be varied. The angle between the rotor portions can be varied to affect the size and shape of the particles that are cut by the blades 32. Adjustable blade assembly 200 has at least one and preferably two locking bolts 228 that can lock top rotor portion 202 and bottom rotor portion 204 in perpendicular alignment to one another (as is shown in FIG. 11) wherein the blades 32 of top rotor portion 202 extend perpendicular to the blades of bottom rotor portion 204. Alternatively, locking bolts 228 that can lock top rotor portion 202 and bottom rotor portion 204 in parallel alignment to one another (by rotating the one rotor portion 202, 204 by 90° s relative to the other, along arrow A as is shown in FIG. 11) wherein the blades 32 of top rotor portion 202 extend parallel to the blades of bottom rotor portion 204. In this arrangement, locking bolts 228 extend through through-holes in the top rotor portion 202 and the bottom rotor portion 204 thereby bolting them in alignment with one another.

Alternatively, the angle of top rotor portion 202 and bottom rotor portion 204 are adjusted by a motion controller 230. Motion controller 230 is any device which modifies the angle of top rotor portion 202 and bottom rotor portion 204. Motion controller 230 includes a hydraulic motor, a hydraulic cylinder, a pneumatic motor, a pneumatic cylinder, an electric motor, a solenoid, an actuator or the like.

While only two rotor portions 202, and 204 are discussed, additional rotor portions, such as three, four or more are hereby contemplated that provide the additional advantage of more chopping.

Figure 12:
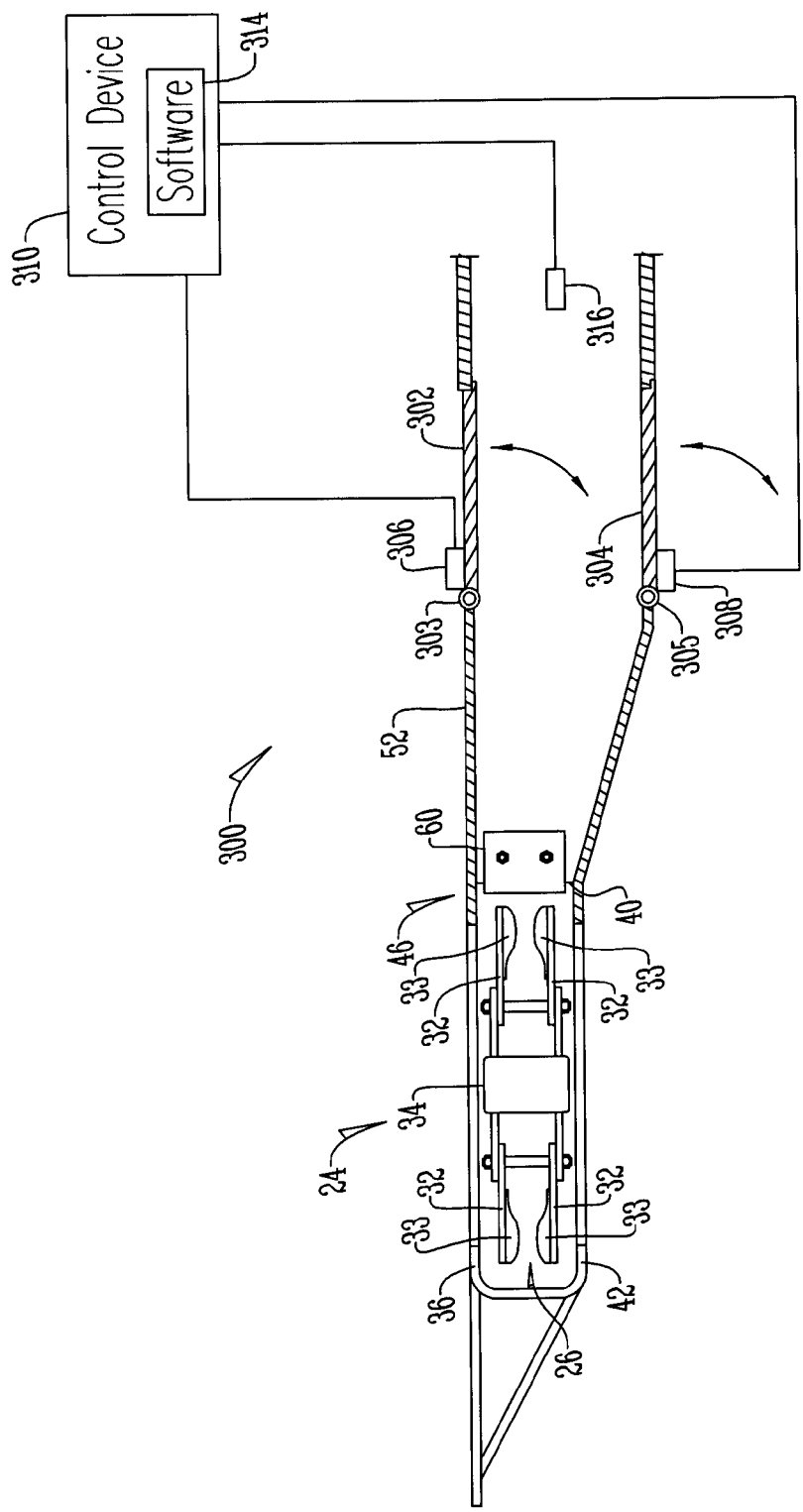
FIG. 12 is a side elevation view of a door and door controller system.
Figure 13:
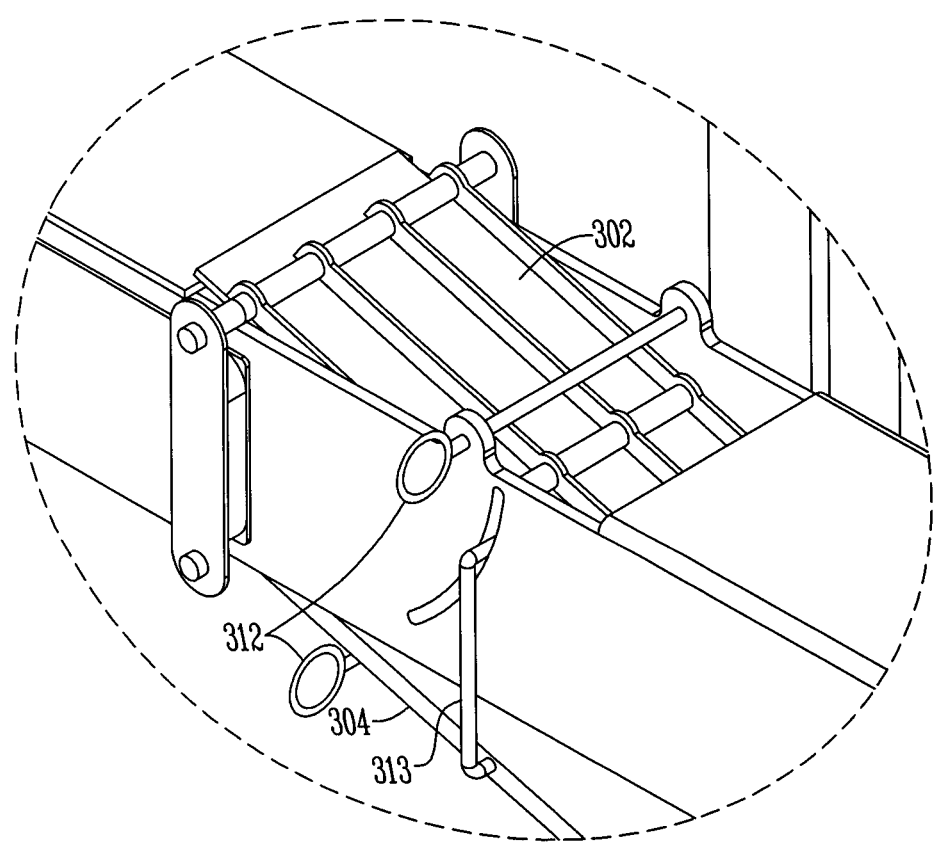
FIG. 13 is a perspective view of a door and a door controller system.

Harvest Rate Controller: FIGS. 12 and 13 shows a door controller system 300 that controls a top door 302 that pivots on hinge 303 and a bottom door 304 that pivots on hinge 305, each of which are positioned in exhaust channel 52. The door control system 300 has a top door actuator 306 connected to top door 302, and bottom door actuator 308 connected to bottom door 304. Actuators 306 and 308 are any form of a device that moves doors 302, 304, by converting energy into motion including hydraulic pressure, pneumatic pressure, or electric current, this includes a hydraulic cylinder, pump or motor, a pneumatic cylinder, pump or motor, a mechanical actuator, an electric actuator, or the like. In one arrangement, both doors 302, 304 are controlled by a single actuator. Actuators 306 and 308 are controlled by controller 310. Controller 310 is any device that controls actuators 306, 308. Doors 302 and 304 have a locking pin 312 which is manually passed through the sidewall of exhaust channel 52 and doors 302, 304 to lock doors 302, 304 in an open condition, or a closed condition.

In an alternative arrangement, top door 302 and bottom door 304 are linked by any mechanical, electrical, hydraulic or other system such that both doors 302, 304 work in unison. This arrangement eliminates the need for dual actuators, as a single actuator opens and closes both doors 302, 304. In one arrangement, as is shown in FIG. 12, to accomplish this functionality, a mechanical linkage 313 connects top door 302 to bottom door 304. In this arrangement, mechanical linkage 313 is positioned outside of the channel through which stover passes, so that stover does not accumulate on the mechanical linkage 313.

When in a closed position, top door 302 and bottom door 304 are in parallel alignment with the top and bottom walls of exhaust channel 52, respectively. In an open condition, top door 302 angles downward into exhaust channel 52, in one arrangement hitting the bottom wall of exhaust channel 52, simultaneously, bottom door 304 angles downward creating a corresponding opening in the bottom wall of exhaust channel 52. In this position, the top door 302 deflects the corn stalk stover downward and out of the exhaust channel 52 through the opening created by bottom door 304. Top door 302 and bottom door 304 are infinitely controllable between any position from fully open to fully closed to infinitely control the amount of corn stalk stover retained by the exhaust channel 52 versus the amount of corn stalk stover returned to the field.

Modern combines 10 are extremely complex devices which incorporate a plurality of extremely complex electronic devices. A common device incorporated into modern combines is a yield monitor which tracks the amount of grain harvested by the combine. This information is tracked using GPS technology to determine how much yield is produced by each portion of the harvested field. In one arrangement control of doors 302, 304 is incorporated into the yield monitor, or any other computing device or control device found in the combine. In this arrangement, controller 310 is then the yield monitor in combine 10.

Controller 310 has the ability to independently control each door 302, 304 associated with each row of corn. That is, the controller 310 can open doors 302, 304 associated with one row, while simultaneously keeping doors 302, 304 associated with another row closed. By integrating the control of doors 302, 304 into the software and controller of the yield monitor the system allows the doors 302, 304 to be controlled based upon the specific conditions of the field. That is, because most yield monitors are connected to GPS and use overlaid maps showing the specific conditions of the field, the yield monitor is able to control the doors 302, 304 in real time based on the conditions of the field, row by row, so as to open doors 302, 304 to leave corn stalk stover on the field in places where additional cover or organic matter is needed, while allowing removal or the stover where it is not needed. Also, this allows for the addition of stover onto the field in places where erosion is a concern such as on hills. A sensor 313 associated with the control device 310 is positioned in each exhaust channel 52 so as to track the collection of stover just as the yield monitor tracks the collection of grain.

Also, when approaching the end of a row of crops, conventionally the corn head 12 of the combine 10 is raised so as to allow the combine to turn around and make a return pass across the field. When doing so, the corn head 12 is generally left running. The control device 310 has software 314 which cycles the doors 302, 304 between an open position to a closed position, or vice versa, at the end of each row when the corn head 12 is raised. This clears the exhaust channel 52 and prevents any buildup of chopped material. Because the corn head 12 is left running when the doors 302, 304 are cycled by control device 310 and software 314, the movement of the doors 302, 304 in association with the air flow generated by the wings 33, has the effect of dislodging any plugged material. This improves efficiency of the system and reduces down time. In addition, as the control device 310 and software 314 do this automatically, it does not distract the driver.

In addition to the above, the system also includes a sensor 316 which senses and measures the amount of stover harvested as well as other conditions of the stover such as moisture content, ph, density, weight, composition, and the like. Sensor 316 is any sensing and/or measuring device, or a plurality of sensing and measuring devices. The information from sensor 316 is transmitted to and associated with the control system 310 and/or yield monitor of the harvesting equipment, and is associated with GPS coordinates. In this way, the quantity or amount of stover, and the conditions of that stover, at any particular position in the field can be tracked, plotted, mapped, saved and transmitted and used by any other piece of equipment for any other purpose. This information can be added to harvest maps as well as uploaded to other pieces of equipment, such as foraging equipment which later picks up the windrows or otherwise processes the material in the windrows. This information is also uploaded to conditioning vehicles which use the information to control the addition of additives to the windrow, such as enzymes, forage conditioner, lime or the like, in the correct and optimum amount prior to collecting, chopping, baling, or further processing the stover. In this way, information from sensor 316 improves the efficiency of the system, maximizes the efficiency of additives, maximizes the quality of the harvested stover, maximizes the nutritional value of the harvested stover, and allows for the appropriate addition of the proper conditioners without under or over conditioning the harvested stover.

In one arrangement, sensor 316 is positioned within exhaust channel 52 or is otherwise associated with exhaust channel 52. In this arrangement a sensor 316 is required for each chopping assembly 24. While this arrangement allows for tracking the quantity and conditions of stover collected in each row, this arrangement can be expensive due to the number of sensors 316 required. In another arrangement to reduce the number of sensors, sensor 316 is positioned within or associated with conveyor 54 or any other downstream portion of the system so as to only require one sensor 316 to track the overall quantity and conditions of the harvested stover.

By incorporating the control device 310 into the existing yield monitor, this dual functioning of tracking harvested grain while controlling the doors 302, 304 while measuring the amount of stover collected, saves money by eliminating the expense of adding another GPS antenna and another computer to the technologically complex combine 10 and further eliminates redundant systems. The yield monitor can also control a plurality of other functions such as autosteering the combine 10, adjusting the harvesting rate of the corn head 12, etc.

Figure 14:
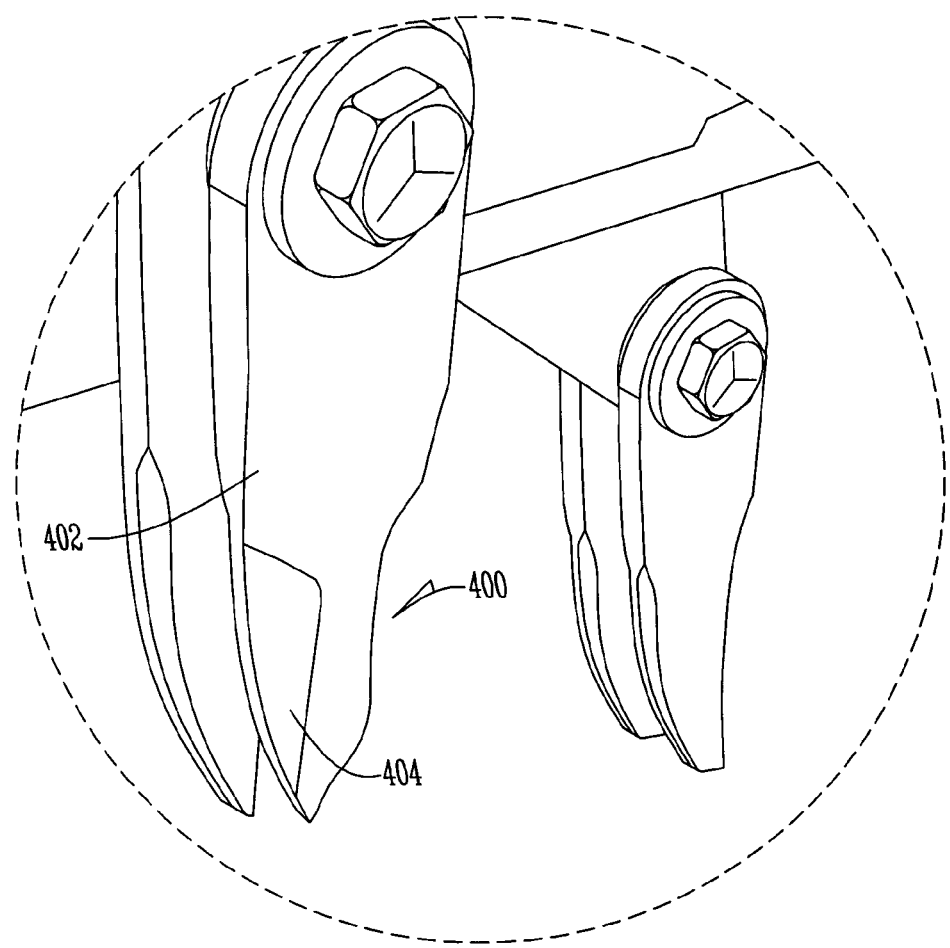
FIG. 14 is a perspective view of a self sharpening blade.

Self Sharpening Blades: FIG. 14 shows a self-sharpening blade 400 for use with a chopping assembly 24. Chopper assembly blades 400 must be sharp to be efficient. As the blades 400 dull they become less efficient and require more energy to chop the corn stalks. In addition, as the blades dull they fail to chop the corn stalks into small pieces, which can lead to plugging. To remedy this problem, self-sharpening blade 400 is used in chopping assembly 24. Self-sharpening blade 400 includes a primary blade assembly 402 made of a conventional metal material. Self-sharpening blade 400 has a hardened layer 404 positioned on one side of primary blade assembly 402. Preferably, hardened layer 404 is positioned along and adjacent the leading edge of the primary blade assembly 402. Hardened layer 404 has a higher level of durability and hardness than primary blade assembly 402. Therefore, as the blade 400 wears with use, the portion of the leading edge made of the primary blade assembly 402 wears away quicker than the portion of the leading edge made of the hardened layer 404. Over time, this disparate amount of wear leads to the hardened layer 404 extending past the primary blade assembly 402, which has the effect of maintaining a sharp leading edge despite wear and use.

In one arrangement, the hardened layer 404 is a separate piece of material that is attached to the primary blade assembly 402 by any means in the art such as bolting or welding or the like.

In another arrangement, the hardened layer 404 is imparted onto the primary blade assembly 402 by induction hardening. Induction hardening is a form of heat treatment in which a metal part is heated by induction heating and then quenched. The quenched metal undergoes a martensitic transformation, increasing the hardness and brittleness of the part. Induction hardening is used to selectively harden areas of a part or assembly without affecting the properties of the part as a whole.

In another arrangement, the hardened layer 404 is a layer of metal which is spray welded onto the primary blade assembly 402. Spray welding involves the projection of small molten particles of metal onto a prepared surface where they adhere and form a continuous coating. To create the molten particles, a heat source, a spray material and an atomization/projection method are required. Upon contact, the particles flatten onto the surface, freeze and mechanically bond, firstly onto the roughened substrate and then onto each other as the coating thickness is increased. As the heat energy in the molten particles is small relative to the size of the sprayed component, the process imparts very little heat to the substrate. As the temperature increase of the coated parts is minimal, heat distortion is not normally experienced.

Any other form of imparting hardness onto one side or edge of primary blade assembly 402 is hereby contemplated including conventionally welding hardened layer 404 onto the primary blade assembly 402, vacuum deposition of hardened layer 404 onto primary blade assembly 402, or the like.

Figure 15:
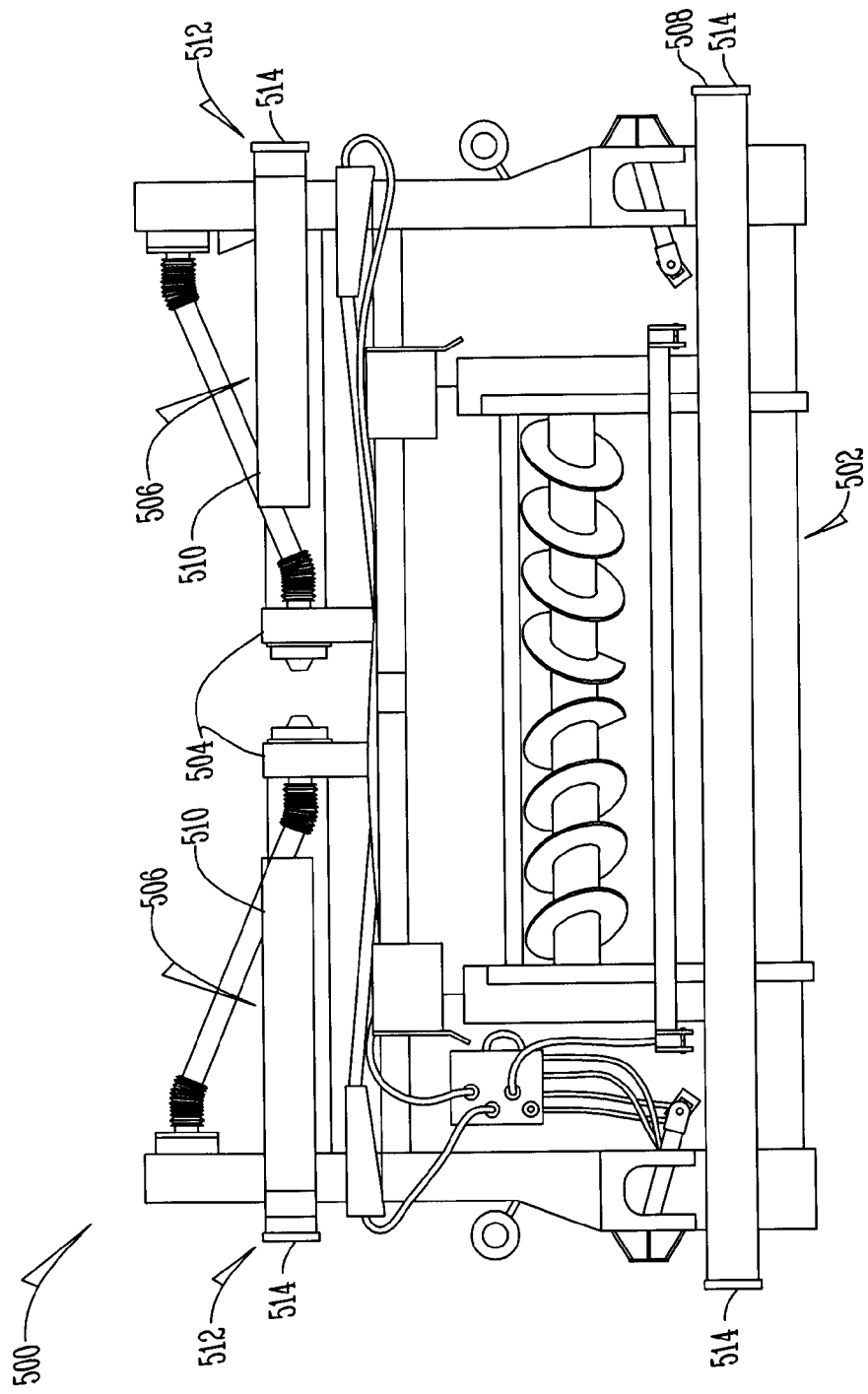
FIG. 15 is an elevation view of a folding corn head assembly.
Figure 16:
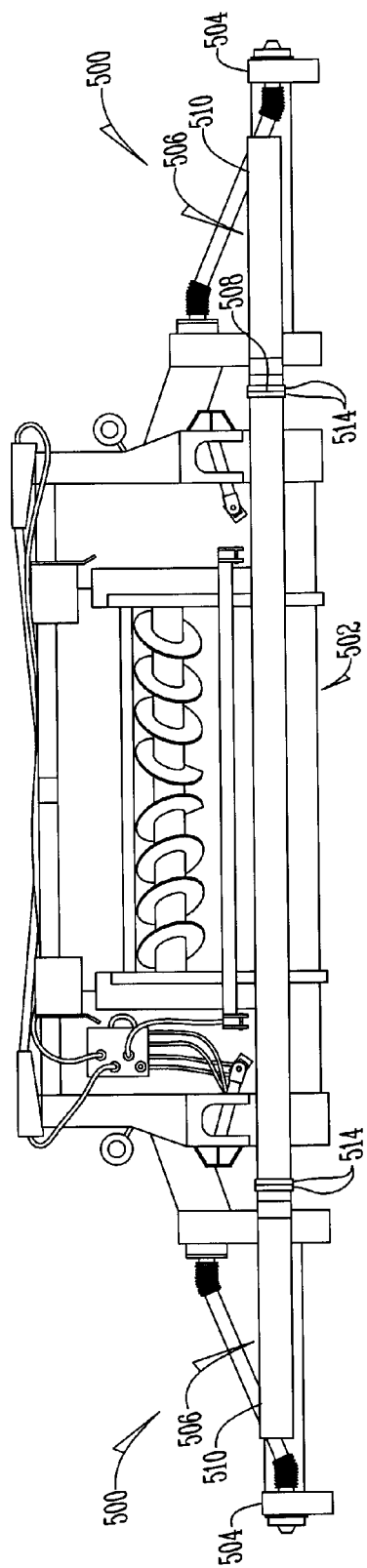
FIG. 16 is an elevation view of a folding corn head assembly.
Figure 17:
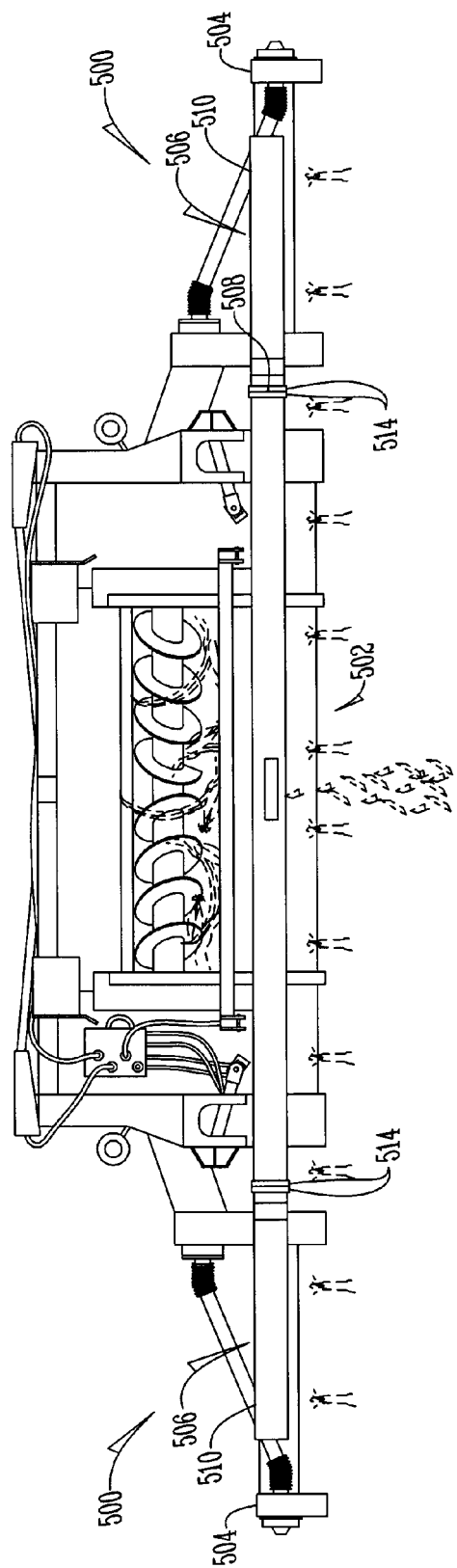
FIG. 17 is an elevation view of a folding corn head assembly.

Folding Corn Head Assembly: FIGS. 15 and 16 show a folding corn head 500. The folding corn head 500 has all the components of the chopping assembly 24 as is described above. However, to facilitate folding of the folding corn head 500, the chopping assembly 24 is modified.

In areas where the roads are small and narrow, corn heads fold to reduce their width. In this arrangement, the folding corn head 500 includes a non-folding portion 502 which is generally positioned in the middle of combine 10. Each row of the non-folding portion 502 includes the chopping assemblies 24 which feed exhaust channels 52 which feed conveyor 54, as is described herein.

Generally, the non-folding portion 502 is flanked on both outside ends by a folding portion 504 of corn head 500. Preferably, the folding portion 504 includes one, two, three, four or any number of entire row assemblies 506. Preferably, a row assembly 506 includes the gathering shoes 14, picking assembly 18, stalk rolls 20 and associated chopping assembly 24 and exhaust channel 52 for each row.

To facilitate folding of the corn head 500, the feed conveyor 54 is broken into a primary conveyor 508 and a folded conveyor portion 510. The primary conveyor 508 connects at each end to the folded conveyor portion at a joint 512. Joint 512 is any joint that allows connection of folded conveyor portion 510 to primary conveyor portion 508 so as to allow for a continuous channel for air flow and the flow of material therethrough.

Joint 512 is the intersection of the exterior edge of primary conveyor 508 and the interior edge of folded conveyor portion 510 (when in an unfolded condition). In one arrangement, joint 512 consists of exterior edge of primary conveyor 508 flushly abutting the interior edge of folded conveyor portion 510 in end-to-end alignment. To help facilitate proper sealing of the folded conveyor portion 510 to the primary conveyor 508 a compressible seal 514 is positioned at the exterior edge of primary conveyor 508 and/or the interior edge of folded conveyor portion 510. Compressible seal 514 is any compressible member such as a rubber seal, a foam seal or the like.

In another arrangement, joint 512 includes an overlapping and intermeshing male/female arrangement. That is, the exterior edge of primary conveyor 508 and the interior edge of folded conveyor portion 510 engage one another such that when the corn head 500 is unfolded the end of one conveyor 508, 510 slips over the end of the other conveyor 508, 510. This arrangement can also utilize a compressible seal 514 as is described above. Primary conveyor 508 as at least one exhaust port 520 through which chopped corn stalk stover is exhausted by the conveyors 508, 510 onto the field. Preferably exhaust port 520 is positioned in the middle of the corn head 500 so as to deposit the corn stalk stover onto the field between the wheels of the combine so as to provide a clean centrally positioned windrow. It is hereby contemplated that exhaust port 520 may be non-centrally positioned, or alternatively there may be multiple exhaust ports 520 such as two, three or more in primary conveyor 508, and/or one or more in each folded conveyor portion 510.

This arrangement provides all the benefits of a folding corn head 500 while simultaneously providing all the benefits of having a chopping assembly 24 having an exhaust channel 52 and a conveyor 54.

In operation, as the harvesting implement moves forward cornstalks are directed toward the picking assembly 18 by the gathering shoes 14. The picking assembly 18 engages the cornstalk with the stalk rolls 20 to separate the ear of corn from the stalk. The ear of corn is then transported by the auger 22 to its desired location.

As the picking assembly 18 is engaging the stalk to separate the ear of corn from the stalk, the stalk is captured by the elongated guide members 48 and 50 and directed toward the input port 44 of housing 28. As the stalk enters the input port 44 and is captured in the slot 43, the blades 32, which are rotated by drive shaft 34, cut the stalk from its roots and further cuts the stalk into stover. Also, debris from the picking assembly 18 falls through the opening 38 in the top wall 36 and is added to the stover. The rotation of the blades 32 creates a fluid dynamic force that blows the stover, with assistance of the housing 28, out of the output port 46, through the exhaust channel 52 to the conveyor 54. The conveyor 54 transports the stover to a windrow position.

What is claimed is:

1. A chopping assembly for a farm implement, comprising:
    a crop picking head mounted on a frame;
    the crop picking head having a folding portion and a non-folding portion;
    the crop picking head having a crop picking assembly;
    the crop picking head having a chopping assembly positioned below the crop picking head;
    the chopping assembly having a first housing mounted to the folding portion of the crop picking head having an input port and an outlet port which connects to an exhaust channel;
    a blade assembly partially disposed within the first housing and positioned to cut a crop received within the input port to supply stover to the exhaust channel; and
    a folded conveyor portion removably connected to a non-foldable primary conveyor and positioned below a corn picking auger to receive stover from the exhaust channel.

2. The assembly of claim 1 wherein the foldable conveyor portion connects to the primary conveyor at a joint thereby forming a continuous channel for the flow of material therethrough.

3. The assembly of claim 1 wherein the foldable conveyor portion connects to the primary conveyor in abutting end-to-end alignment.

4. The assembly of claim 1 wherein the foldable conveyor portion and primary conveyor connect to one another in overlapping alignment.

5. The assembly of claim 1 further comprising at least one exhaust port in the primary conveyor through which stover from the foldable conveyor portion and primary conveyor is exhausted.

6. The assembly of claim 1 wherein a compressible seal is positioned at an exterior edge of the primary conveyor and an interior edge of the folded conveyor portion.

7. A chopping assembly for a farm implement, comprising:
- a plurality of row assemblies mounted to a frame and having picking assemblies and an auger positioned behind the picking assemblies;
- a chopping assembly positioned below and mounted to each row assembly; and
- a primary conveyor and foldable conveyor portions positioned adjacent an exhaust channel of the chopping assembly.

8. The assembly of claim 7 wherein the primary conveyor and the foldable portions have a removable cover.

9. The assembly of claim 7 wherein a seal is positioned at an exterior edge of the primary conveyor.

10. The assembly of claim 7 wherein a seal is positioned at an interior edge of the folded conveyor portions.

* * * * *